United States Patent Office 3,363,022
Patented Jan. 9, 1968

3,363,022
CATALYTIC DEHYDROCHLORINATION OF CHLOROPARAFFINS
Jonas P. Harrison, Pinole, Calif., assignor to Chevron Research Company, a corporation of Delaware
No Drawing. Filed June 10, 1965, Ser. No. 463,026
3 Claims. (Cl. 260—677)

ABSTRACT OF THE DISCLOSURE

Process for dehydrochlorinating monochloro normal alkanes of 9 to 20 carbon atoms to produce olefins suitable for alkylation of benzene to produce straight-chain alkylbenzenes substantially free of non-biodegradable material comprising heating the monochloro normal alkanes at a temperature of above about 375° F. in the liquid phase and in the presence of a water impregnated activated particulate bauxite having an absorbed water content of 5 to 30%, by weight, until evolution of hydrogen chloride ceases.

---

This invention relates to the dehydrochlorination of aliphatic monochloro hydrocarbons, and more particularly, to the dehydrochlorination in the liquid phase of monochlorinated alkanes of 9 to 20 carbon atoms.

Recently, much publicity has been given to the biodegradability of synthetic detergents. Because the highly branched alkylbenzene sulfonates (ABS), particularly tetrapropylene benzene sulfonate, are generally considered to be resistant to biodegradation, the industry has turned to straight-chain alkylbenzene sulfonates (LAS), since they are regarded as having improved properties of biodegradability.

One route to LAS is the alkylation of benzene with straight-chain olefins, the olefins having been obtained by catalytically dehydrochlorinating monochloroparaffins.

The monochloroparaffins or alkyl chlorides are of from about 9 to 20 carbons, more usually of from about 11 to 14 carbons. While a single alkane can be used in their preparation, usually mixtures of alkanes are employed. Usually, liquid phase chlorination is used, chlorinating to about 15 to 35 mole percent monochlorides, in order to minimize the amount of polychlorinated hydrocarbon. This results in carrying along to the alkylation process as an inert diluent, the non-chlorinated alkane (65–85%).

It is found that in the alkylation subsequent to dehydrochlorination the product obtained has significant amounts of material, which ultimately appears in sewage tests as nonbiodegradable or hard core. The amount of hard core must be minimized. Preferably, it should not be more than 2% for a satisfactory product.

It has now been found that the non-biodegradable hard core can be reduced significantly by effecting the dehydrochlorination reaction in the liquid phase in the presence of activated particulate aluminas, particularly bauxite, which have been impregnated with water.

The preparation of activated bauxite is known. Bauxite containing principally alumina trihydrate is heated to remove combined water, and to render it porous and adsorptive. Thus, bauxite, in the form of particles of desired size, e.g., 2 to 300 mesh (Tyler), is heated to a temperature of 700° F. and higher to form particulate material having a surface area of 50–400 square meters per gram, more usually 100–250 square meters per gram.

In carrying out the invention, activated bauxite is treated to impregnate it with water, such as by contacting it with a water-saturated gas, such as air, methane, nitrogen, and steam. This pre-treatment operation can simply be performed by immersing the bauxite material in water for a sufficiently long period of time to saturate it. Bauxite that contains absorbed water to an extent less than complete saturation is also effective in carrying out the invention. Thus, there can be used bauxite that contains about one-half the water required for complete saturation. Expressed in other words, suitable bauxite is that containing 5, preferably 10, to 30 percent water, by weight, based on the bauxite, and is determined by noting the weight of water removed after heating the water-containing bauxite for 16 hours at 110° C.

As stated, the dehydrochlorination reaction is effected in liquid phase. Accordingly, the temperature of reaction is below the vaporization temperature of the lowest boiling chlorohydrocarbon constituent or at its vaporization temperature when refluxing. Generally, the temperature of reaction is at least 375° F. and does not exceed about 450° F. In the case of chloroalkanes of 11 to 14 carbon atoms, the temperature of reaction is within about the range 375° F. to 430° F.

In the event a superatmospheric pressure is brought to bear on the reaction mixture, a higher temperature than that specified can be used, so long as the reaction is carried out in the liquid phase. Reaction is continued until the evolution of hydrogen chloride ceases.

The amount of water-impregnated bauxite catalyst that can be used is within about the range 0.3 to 10 percent, by weight, based on the chloroalkanes.

The reaction is adaptable to continuous operation. The chloroalkanes can be passed continuously into the reaction zone and contacted with the bauxite dehydrochlorination catalyst at the specified temperatures. The space velocity is not critical, and in general ranges from about 0.1 to 100 LHSV, usually 0.1 to 10 LHSV, in volume per volume per hour. The product can be washed with water or base to remove residual hydrogen chloride and then dried in conventional manner, for example, simply stripping with an inert gas, such as nitrogen.

The following examples are offered by way of illustration and not by way of limitation.

In the examples, the apparatus used was a 4-neck, 250 cc. flask fitted with stirrer, nitrogen bleed, reflux condenser, and heating mantle. Feedstock was placed in the flask, purged, and heated to reaction temperature. Catalyst was added either at reaction temperature or cold. Reaction time was that occurring at temperatures above 400° F. The reaction was followed by withdrawing samples at time intervals and analyzing by gas phase chromatography and bromine number, or both. Chlorine contents of products were obtained by X-ray fluorescence.

Example 1

The chloroparaffin feed used in this example was a feedstock prepared by chlorinating a straight-chain paraffin mixture containing about equal amounts of undecane, dodecane, tridecane and tetradecane to a mixture having a chlorine content of 4.7% by weight. The mixture had a density of 0.787 g./cc. and a refractive index of 1.4298 at 25° C.

About 75 g. of this chloroparaffin-containing mixture was added to the apparatus above-described. The vessel was heated to reflux temperature, i.e., about 420–430° F. About 7.5 g. of activated bauxite of 100/200 mesh size substantially free of water and having a surface area of 229 square meters per gram was added over a period of 5–10 minutes. The temperature dropped to 10–30° F., then rose again to reflux temperature. In approximately 2¾ hours heating was discontinued, since the evolution of hydrogen chloride as determined by moist pH paper had ceased. The product was cooled, nitrogen stripped and analyzed. Chlorine content was 0.03% weight and the bromine number 14.2 (theory, 23.6), thus giving a yield of olefin based on bromine number of 60%.

An alkylbenzene was prepared by alkylating benzene with the above-described olefin mixture in the presence of hydrogen fluoride, using a 1:10:10 mol ratio of olefin to benzene to HF. The alkylation was done batchwise at 40–60° F. After alkylation, the HF phase was removed. The hydrocarbon phase was washed with 20% potassium hydroxide, and phase separated. The hydrocarbon layer was distilled to separate straight-chain alkylbenzene from unreacted benzene and paraffin. An alkylbenzene fraction boiling in about the range 530° F. to 665° F. was then in conventional manner sulfonated using oleum and neutralized with sodium hydroxide to give sodium alkylbenzene sulfonate (LAS) detergent.

The LAS detergent formed in this manner was essentially biologically soft (i.e., destroyed by bacterial action) except for about 4%, which was unaffected in a usual laboratory sewage treatment. The procedure used for testing is described in W. A. Sweeney and J. K. Foote, Journal Water Pollution Control Federation, page 14. January 1964.

Example 2

Substantially the same procedure was followed as in Example 1, using the same chloroparaffin mixture in about the same amount, except that 1.5 g. of water-saturated bauxite was used (about 11% water in the bauxite). The reaction was stopped after 2½ hours. The chromatogram showed no visible chloroparaffin peaks. The bromine number was 19 (theoretical, 23.5) and the chlorine content, 0.05%. Based on bromine number, yield of olefin was 81%.

Example 3

Example 2 was repeated, except that the catalyst was saturated with water, the surface dried, and the chloroparaffins added to the catalyst cold. The mixture was then heated to reaction (reflux) temperature quickly. After one hour reaction time plus about 15 minutes heatup time, the reaction was deemed complete. The bromine number was 21.1 (theoretical, 23.4), thus giving an olefin yield of 90%.

Example 4

Example 3 was repeated except that the reaction was carried out for about 2 hours, yield of olefin was determined to be 88%.

This product was alkylated, sulfonated, and neutralized with sodium hydroxide to obtain the LAS detergent. This detergent material contained only about 1.9% by weight of detergent which was unaffected by the laboratory sewage treatment as in Example 1.

I claim:

1. Process for dehydrochlorinating monochloro normal alkanes of 9 to 20 carbon atoms to produce olefins suitable for the preparation of straight-chain alkylbenzenes substantially free of non-biodegradable material which comprises heating above about 375° F. said monochloro normal alkanes in the liquid phase in the presence of water-impregnated activated particulate bauxite having an absorbed water content of 5 to 30%, by weight, based on the bauxite, until evolution of hydrogen chloride ceases.

2. Process according to claim 1, wherein the particulate bauxite catalyst before impregnation with water has a surface area of 100 to 250 square meters per gram.

3. Process according to claim 1, wherein the bauxite before reaction is saturated with water.

References Cited

UNITED STATES PATENTS

| | | | |
|---|---|---|---|
| 2,357,978 | 9/1944 | Schmerling et al. | 260—671 |
| 2,897,246 | 7/1959 | DeKeizer et al. | 260—671 |
| 2,899,473 | 8/1959 | Leprince et al. | 260—677 |

DELBERT E. GANTZ, *Primary Examiner.*

J. D. MYERS, *Assistant Examiner.*